United States Patent
Su et al.

(10) Patent No.: US 8,274,581 B2
(45) Date of Patent: Sep. 25, 2012

(54) DIGITAL IMAGE CAPTURE DEVICE AND DIGITAL IMAGE PROCESSING METHOD THEREOF

(75) Inventors: Yu-Tsung Su, Taipei Hsien (TW); Cheng-Wei Huang, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 450 days.

(21) Appl. No.: 12/548,447

(22) Filed: Aug. 27, 2009

(65) Prior Publication Data

US 2010/0259640 A1 Oct. 14, 2010

(30) Foreign Application Priority Data

Apr. 8, 2009 (CN) .......................... 2009 1 0301435

(51) Int. Cl.
| | |
|---|---|
| H04N 5/76 | (2006.01) |
| H04N 5/57 | (2006.01) |
| H04N 5/232 | (2006.01) |
| H04N 9/04 | (2006.01) |
| H04N 5/335 | (2011.01) |
| H04N 3/14 | (2006.01) |
| H04N 9/083 | (2006.01) |
| G03B 13/00 | (2006.01) |

(52) U.S. Cl. ..................... 348/231.2; 348/687; 348/345; 348/273

(58) Field of Classification Search .... 348/231.2–231.6, 348/222.1
See application file for complete search history.

(56) References Cited

U.S. PATENT DOCUMENTS

| | | | |
|---|---|---|---|
| 6,563,538 B1* | 5/2003 | Utagawa | 348/273 |
| 7,256,828 B2* | 8/2007 | Nilsson et al. | 348/273 |
| 8,155,472 B2* | 4/2012 | Utsugi | 382/264 |
| 2005/0162541 A1* | 7/2005 | Ito | 348/345 |
| 2005/0168620 A1* | 8/2005 | Shiraishi | 348/345 |
| 2007/0103601 A1* | 5/2007 | Izumi | 348/687 |
| 2007/0146528 A1* | 6/2007 | Yanagi | 348/333.01 |
| 2008/0239121 A1 | 10/2008 | Egawa | |

FOREIGN PATENT DOCUMENTS

| | | |
|---|---|---|
| TW | 255642 | 5/2006 |
| TW | 200915856 A | 6/2009 |

* cited by examiner

*Primary Examiner* — Jason Chan
*Assistant Examiner* — Pritham Prabhakher
(74) *Attorney, Agent, or Firm* — Altis Law Group, Inc.

(57) ABSTRACT

An image capture device includes an image capture unit, a switching unit, a calculation unit, a comparison unit, and a display unit. The image capture unit captures consecutive images. The switching unit switches to a playback mode. The calculation unit calculates each of gradient values between adjacent pixels within each the image and cumulates a total value composed of the gradient values of the image. The comparison unit compares different total values corresponding to different images to determine the image having a maximum total value. The display unit displays the acquired image.

18 Claims, 2 Drawing Sheets

DIGITAL IMAGE CAPTURE DEVICE AND DIGITAL IMAGE PROCESSING METHOD THEREOF

BACKGROUND

1. Technical Field

The present disclosure relates to image capture devices and methods and, particularly, to a digital image capture device and a digital image processing method capable of identifying the clearest image from a number of consecutive images.

2. Description of the Related Art

Currently used image capture devices such as cameras can capture multiple consecutive images of a single subject allowing selection of the clearest one among them. However, such a selection is inconvenient, time-consuming and inaccurate. For example, the selection process requires reviewing one at a time, zooming in and examining a specific image, and comparison thereof by memory.

Therefore, it is desirable to provide a digital image capture device and a digital image processing method thereof which can overcome the described limitations.

BRIEF DESCRIPTION OF THE DRAWINGS

Many aspects of the disclosure can be better understood with reference to the drawings. The components in the drawings are not necessarily drawn to scale, the emphasis instead being placed upon clearly illustrating the principles of the present digital image capture device and the digital image processing method thereof. Moreover, in the drawings, like reference numerals designate corresponding parts throughout the views.

DETAILED DESCRIPTION

Embodiments of the digital image capture device and the digital image processing method thereof are described in detail here with reference to the drawings.

Figure 1:
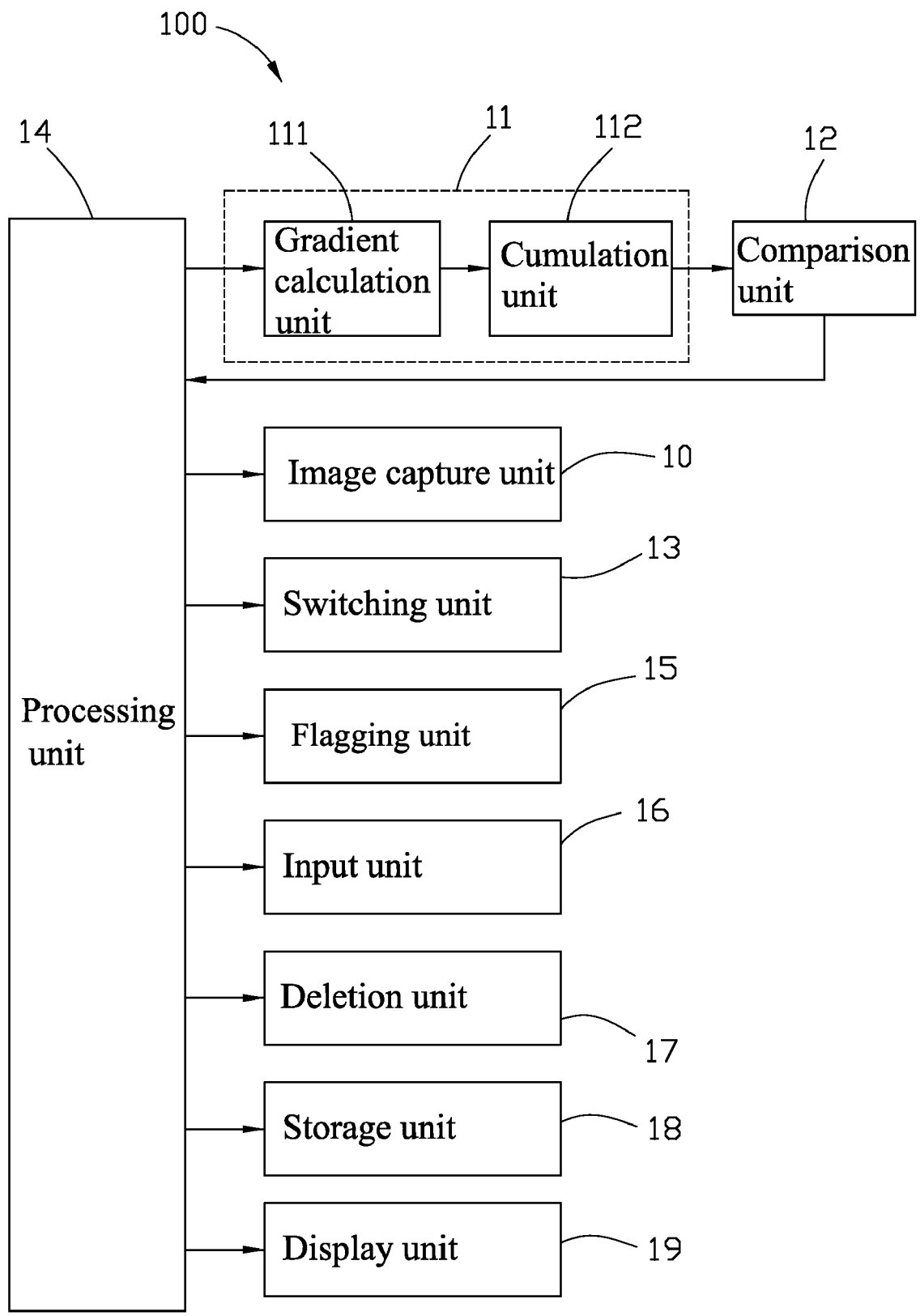
FIG. 1 is a functional block diagram of a digital image capture device, according to an embodiment.

As shown in FIG. 1, a digital image capture device 100 in accordance with an exemplary embodiment includes an image capture unit 10, a calculation unit 11, a comparison unit 12, a switching unit 13, a processing unit 14, a flagging unit 15, an input unit 16, a deletion unit 17, a storage unit 18 and a display unit 19. In this embodiment, the image capture device 100 is a digital still camera, although other image capture devices such as cellular phones having a camera module are equally applicable while remaining well within the scope of the disclosure.

The image capture unit 10 is configured for capturing a plurality of consecutive images. The images are sequentially processed, by the processing unit 14, into digital images stored in the storage unit 18 or displayed on the display unit 19 for review (see below). The image capture unit 10 may include a Charge Coupled Device (CCD).

The storage unit 18 is configured for storing the images from the image capture unit 10, and may be a semiconductor memory, a magnetic memory or other. In this embodiment, the storage unit 18 is an erasable programmable read only memory.

The switching unit 13 is configured for switching the display unit 19 into a playback mode. In the playback mode, the display unit 19 displays the captured digital images.

The calculation unit 11 includes a gradient calculation unit 111 and cumulation unit 112. The gradient calculation unit 111 is configured for calculating a gradient value Gi for each pixel of each image to allow determination of which image is the clearest from the capture (see below). The Gi denotes the maximum brightness difference between the pixel and an adjacent pixel of the image. The formula for the Gi is: Gi (x, y)=I (x+1, y)–I (x, y), where Gi (x, y) is the gradient value of the ith pixel located at: x, y; I (x, y) is a brightness value of an ith pixel; I (x+1, y) is a brightness value of the adjacent pixel at: x+1, y. The cumulation unit 112 is configured for cumulating all the gradient values $G_i$ of all pixels of the image to acquire a total value T of the image, where the $G_i$ is a gradient value of the ith pixel. The formula of the T of the image is as follows:

$$T = \sum_R |G(x, y)|,$$

where R is the amount of the pixels of the image. Generally, the higher the T is, the sharper the image is.

The comparison unit 11 is configured for comparing the different total values Ts of the images to acquire a maximum total value Tmax. The image having the maximum total value Tmax is the clearest one among the images.

The flagging unit 15 is configured for flagging the clearest image, such as with "√" for reviewing on the display unit 19. In another example, the flagging unit 15 also alternately flags other images to show that they are not the clearest one on the display unit 19.

The display unit 19, such as a liquid crystal display (LCD) panel, is configured for displaying the digital images and, if any, the accompanying flag, allowing determination of the nature of processing to be performed, if any. It can then be determined if any of the captured images are to be kept and others deleted.

The input unit 16 receives a user input designating a selection from different marks representative of different meanings. The input unit 16 and the display unit 19 can be integrated into a touch panel. In practice, the input unit 16 can classify the captured images corresponding to flags appearing on the display unit 19 and accordingly the one of the captured image having the symbol '√' not contacted is interpreted as the unselected portion. Alternatively, the input unit 16 can be programmed in an inverse manner, interpreting the one of the captured images corresponding to the contacted area of the display unit 19 as the unselected one.

The deletion unit 17 deletes the images as directed by the processing unit 14 if instruction thereto is input.

Figure 2:
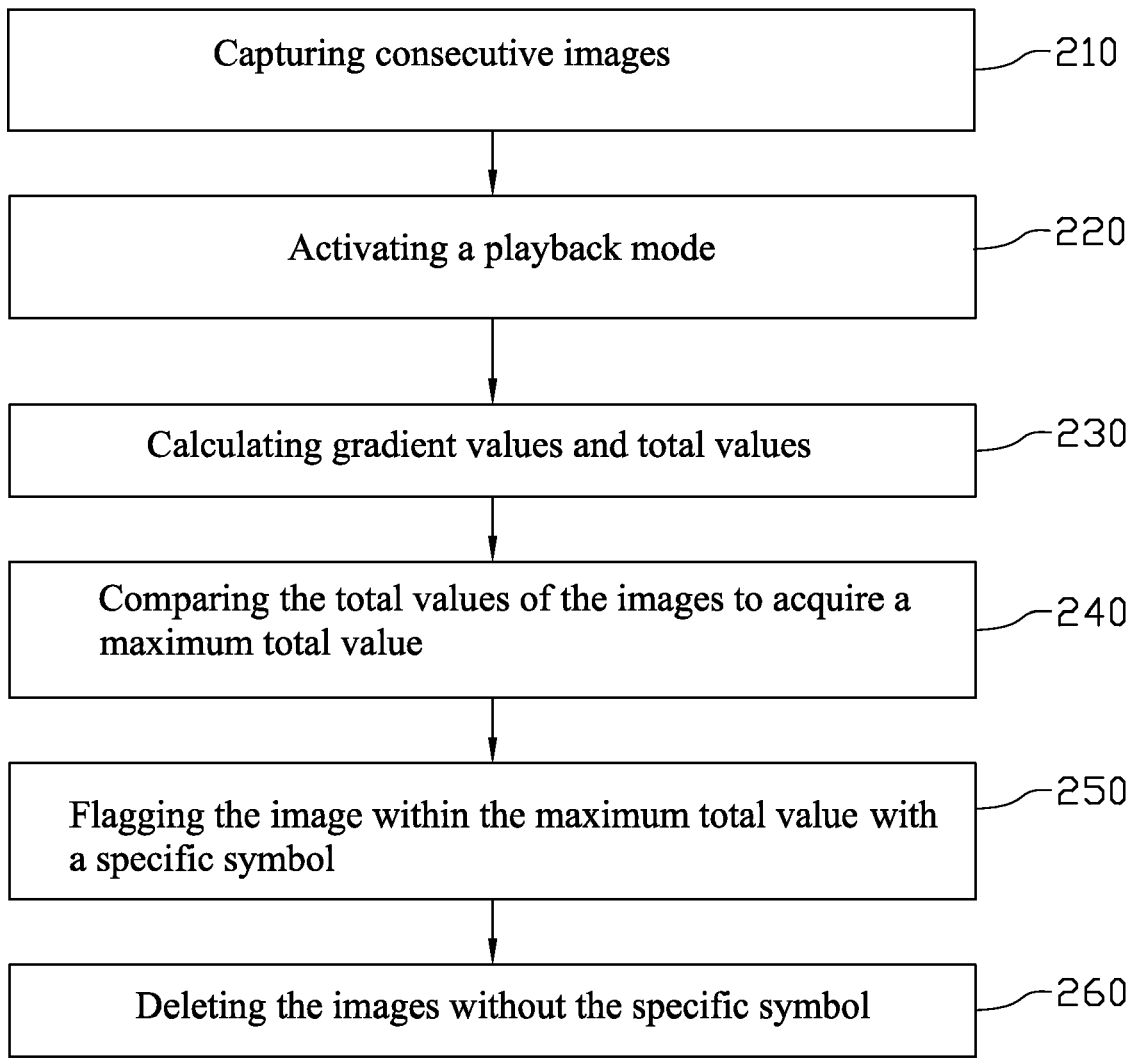
FIG. 2 is a flowchart of a digital image processing method, according to an embodiment, for a digital image capture device, such as, for example, that of FIG. 1.

Referring to FIG. 2, an embodiment of a digital image processing method as disclosed may be performed by, for example, the image capture device 100 of FIG 1.

In step 210, consecutive images are captured by the image capture unit 10.

In step 220, a playback mode is activated by the switching unit 13 to display the captured images.

In step 230, a gradient value Gi between the adjacent pixels and each total value composed of the gradient values Gi within the image are calculated by the calculation unit 11.

In step 240, the total values T of these images are compared to acquire the maximum total value Tmax.

In step 250, the image having the Tmax is flagged with a specific symbol to be differentiated from other stored images.

In step 260, the images without the specific symbol are deleted by the deletion unit 17.

It is noted that the disclosed image capture device acquires the clearest image from the continuous capture, allowing quick and simple access to the captured image quality.

While the disclosure has been described by way of example and in terms of exemplary embodiment, it is to be understood that the disclosure is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An image capture device, comprising:
   a display unit having a playback mode;
   an image capture unit configured for capturing a plurality of consecutive images;
   a storage unit configured for storing the plurality of consecutive images captured by the image capture unit;
   a switching unit configured for switching the display unit to a playback mode;
   a calculation unit
   a comparison unit and
   wherein, when the display unit is switched into the playback mode, the display unit displays the plurality of consecutive images stored in the storage unit, the calculation unit calculates gradient values between every two adjacent pixels within each of the plurality of consecutive images, respectively accumulates magnitudes of the gradient values of each of the plurality of consecutive through images, and acquires a plurality of total values according to the accumulation, and the comparison unit compares the total values corresponding to the plurality of consecutive through images, and determines which through image has a maximum total value according to the comparison.

2. The image capture device of claim 1, further comprising a flagging unit configured for flagging the image having the maximum total value with a specific symbol.

3. The image capture device of claim 1, further comprising a flagging unit configured for flagging the images without the maximum total value.

4. The image capture device of claim 3, further comprising a deletion unit configured for deleting the flagged images.

5. The image capture device of claim 1, further comprising an input unit configured for receiving user input to operate the device.

6. The image capture device of claim 5, wherein the display unit and the input unit are integrated in a touch panel.

7. The image capture device of claim 1, wherein the calculation unit comprises a gradient calculation unit and a cumulation unit, the gradient calculation unit configured for calculating the gradient values and the cumulation unit configured for respectively accumulating magnitudes of the gradient values of each of the plurality of consecutive images, and acquiring the plurality of total values.

8. An image capture device, comprising:
   an image capture unit configured for capturing a plurality of consecutive images;
   a switching unit configured for switching to a playback mode;
   a calculation unit configured for calculating gradient values between adjacent pixels within the images and a total value of composed of the gradient values within the image;
   a comparison unit configured for comparing different total values corresponding to different images to determine the image having a maximum total value;
   a display unit configured for displaying the acquired images;
   a flagging unit configured for flagging the image having the maximum total value with a specific symbol; and
   a deletion unit configured for deleting images without the specific symbol displayed by the display unit in response to user input.

9. The image capture device of claim 8, wherein the flagging unit is also configured for alternatively flagging images without the maximum total value.

10. The image capture device of claim 8, further comprising a storage unit configured for storing the captured images.

11. The image capture device of claim 8, further comprising an input unit configured for receiving user input.

12. The image capture device of claim 11, wherein the display unit and the input unit can be integrated in a touch panel.

13. The image capture device of claim 8, wherein the calculation unit comprises a gradient calculation unit and a cumulation unit, the gradient calculation unit configured for calculating the gradient values and the cumulation unit configured for cumulating the gradient values of all the pixels within the image to be a total value.

14. A digital image processing method, comprising:
    capturing a plurality of consecutive images via an image capture unit;
    storing the plurality of consecutive images captured by the image capture unit in a storage unit;
    switching a display unit into a playback mode;
    displaying the plurality of consecutive images stored in the storage unit via the display unit, calculating gradient values between every two adjacent pixels within each of the plurality of consecutive images, respectively accumulating magnitudes of the gradient values of each of the plurality of consecutive images, and acquiring a plurality of total values according to the accumulation, comparing the total values of the images and determining which image among the plurality of consecutive images has a maximum total value according to the comparison, when the display unit is switched into the playback mode; and
    displaying the image having the maximum total value.

15. The digital image processing method of claim 14, further comprising flagging the image having the maximum total value with a specific symbol.

16. The digital image processing method of claim 15, further comprising, alternatively, flagging other images without the maximum total value.

17. The digital image processing method of claim 16, further comprising deleting the other images without the maximum total value.

18. The digital image processing method of claim 17, further comprising receiving user input to delete the other images without the maximum total value.

* * * * *